United States Patent [19]

England

[11] 4,077,158

[45] Mar. 7, 1978

[54] AGRICULTURAL GREENHOUSING RECONCILING INTENSIFIED URBAN METHODS

[76] Inventor: Will Clarke England, 7310 Eastcrest Dr., Austin, Tex. 78752

[21] Appl. No.: 689,627

[22] Filed: May 24, 1976

[51] Int. Cl.² .............................................. A01G 9/00
[52] U.S. Cl. .......................................... 47/59; 47/17; 52/86; 119/3; 47/1.1
[58] Field of Search ............... 52/63, 82, 86, 88, 639, 52/641, 644, 2; 47/17, 1.2

[56] References Cited

U.S. PATENT DOCUMENTS

| | | | |
|---|---|---|---|
| 2,827,138 | 3/1958 | Roy | 52/86 |
| 3,461,605 | 8/1969 | Stanhope | 47/17 |
| 3,807,088 | 4/1974 | Jones | 47/1.2 |
| 3,854,253 | 12/1974 | Slowbe | 52/63 X |
| 3,905,153 | 9/1975 | Enter | 47/1.7 X |
| 3,949,522 | 4/1976 | Kehl et al. | 47/17 |

Primary Examiner—Robert E. Bagwill

[57] ABSTRACT

Upon the premises that greater and better food production is vital, this invention (herein abbreviated as AGRIUM) discloses an architecturally and aesthetically acceptable urban domicile, methodology and intensification of continuous food production in the urban or suburban environment with energy and resource conservation, automation and mass production techniques and apparatus included.

19 Claims, 22 Drawing Figures

AGRICULTURAL GREENHOUSING RECONCILING INTENSIFIED URBAN METHODS

SUBJECT MATTER OF THE INVENTION

This invention relates generally to intensified food production and relates more specifically to structural enclosures, automated service systems, energy and resource conservation apparatus and mass production techniques applicable to intensified, continuous food production in the cities' backyards and urban environments. It is noted that the shift of the world's population from rural to urban has not yet been accompanied by any significant relocation of the food sources, however, the urban sprawl now consumes the original locations with a voracious appetite that shall increase the hunger unless the urban backyards see greater utility than raising noisy dogs and pretty grass!

OBJECTS OF THE INVENTION

Providing adequate shelter and environment for human habitation is a major industry of our civilization as important as providing food for human consumption. Providing adequate shelter and environment for providing food is an object of this invention which extends the human habitat to include food production. It is an object of the invention to provide agricultural greenhousing reconciling intensified urban methods of operation (herein abbreviated as AGRIUM).

An object of the invention is to eliminate packing, shipping, freezing and even harvesting unripe produce and provide for direct continuous conveyance of ripe produce from plants to neighboring kitchens.

Another object of the invention is to eliminate weeding, herbicides, pesticides, fungicides and even scarecrows from an agricultural cycle of requirements.

Another object of the invention is to eliminate the seasonal cycle of food production and limit the effects of climatic change upon a continuous growing of produce.

Still another object of the invention is to construct such greenhousing of strong and durable, yet economical combinations of materials and repetitive arrangements of such materials as to apply mass production techniques to the fabrication of such greenhousing.

A still further object of the invention is to automate, building, integrate or make convenient the operation and use of any and all systems or devices applicable to intensified agriculture under greenhousing.

A still further object of the invention is to take advantage or turn to a benefit any useful and appropriate climatological, diurnal or solar effect that is of utility to the AGRIUM.

A still further object of the invention is to provide for use of soilless agriculture and automated hydro-nutrient plant feeding.

A still further object of the invention is to integrate the raising of plants and aquatic life and optimize the available precipitation as a source of water.

A still further object of the invention is cool, heat and humidify the AGRIUM mainly by water and sun which fall freely upon the AGRIUM, and even to ventilate the AGRIUM mainly by natural circulations and wind.

INDEX OF INVENTION

GROUPS and SYSTEMS

1 — AGRIUM, general and miscellaneous
2 — Structural skeleton and skin covering
3 — Planters
4 — Rail-riding service tram system
5 — Hydro-nutrient plant feeding system
6 — Water storage and utility systems of moat, pond and cistern
7 — Air circulation, filtration and ventilation system
8 — Water circulation and service systems
9 — Vacuum cleaning and air jet pollinating-root aeration systems
10 — Produce collection, conveyance and concentration system

SUBGROUPS, SUBSYSTEMS and ITEMS 1.1 Floor foundation
1.2 Entrance
   1.21 Entrance steps
   1.22 Entrance porch
   1.23 Entry platform 1.3 Service counter and storage cabinets
1.4 Lighting
1.5 Rear service cabinets
   1.51 Electric service and controls cabinet
   1.52 Patron lockers
   1.53 Interior shelves
1.6 Electric service entrance
2.1 Corresponding structural frames
   2.11 Front structural frame
   2.12 Corresponding interior front frame
   2.13 Standard interior frame
   2.14 Rear structural frame
   2.15 Intermediate central planter frame
2.2 Frame interconnections
   2.21 Bottom beam
   2.22 Ridge joist
   2.23 Planter rail
   2.24 Skin covering lateral support
   2.25 Entry joist
2.3 Entrance frame
2.4 Fence-cover frames
   2.41 Moat fence-cover frame
   2.42 Pond fence-cover frame
   2.43 Pond fence summer brace
2.5 Skin covering
   2.51 AGRIUM exterior skin covering
   2.52 AGRIUM interior skin covering
   2.53 Moat fence-cover skin covering
   2.54 Pond fence-cover skin covering
   2.55 Rear service cabinet roof skin covering
3.1 Floor planters
   3.11 Central floor planters
   3.12 Side floor planters
3.2 Suspended planters
   3.21 Central suspended planters
   3.22 Side bench planters
   3.23 Cantilevered hanging planters
   3.24 Attic planter
   3.25 Mushroom planter
3.3 Planting medium
4.1 Rail-riding service tram
   4.11 Tram structural frame
   4.12 End ladder and scaffold support
   4.13 Bottom platform
   4.14 Top platform
   4.15 Tram wheels
   4.16 Tram rope and pulley drive system
   4.17 Tram moveable scaffold
4.2 Tram rails
5.1 Hydro-nutrient storage and mixing tanks
5.2 Hydro-nutrient gravity vertical distribution system
   5.21 Vertical piping network
   5.22 Solenoid valve
   5.23 Adjustable flow valves
   5.24 Control valves
5.3 Hydro-nutrient planter horizontal distribution systems
   5.31 Horizontal slotted pipe distribution lines
   5.32 Horizontal slotted pipe
   5.33 String capillary plant feeder
   5.34 String capillary and siphon plant feeder
5.4 Hydro-nutrient
6.1 Moat systems
   6.11 Moat
   6.12 Moat foundation
   6.13 Moat divider
   6.14 Moat breeder and service tank
   6.15 Moat overflow port
   6.16 Moat circulation pipeline
   6.17 Moat aeration apparatus
   6.18 Moat pump
   6.19 Moat divider valves
6.2 Summer evaporative cooling-winter solar heating pond systems
   6.21 Pond
   6.22 Pond summer fence-winter cover
   6.23 Pond sprinkler system
   6.24 Pond drawdown siphon to cistern
   6.25 Pond water circulation flow through trough
   6.26 Pond water circulation system injection jet
   6.27 Pond-moat water level valve
   6.28 Pond bottom
   6.29 Pond wall
6.3 Precipitation or rainwater and thermal storage cistern system
   6.31 Cistern
   6.32 Cistern pump
   6.33 Variable level moat to cistern drain
   6.34 Cistern bottom
   6.35 Cistern wall
   6.36 Cistern top
   6.37 Cistern access
   6.38 Cistern water level guage
   6.39 Cistern insulation
7.1 Air intake, circulation and filtration system
   7.11 Aggregate air filter
   7.12 Aggregate air filter support mesh
   7.13 Summer insect screen
   7.14 Winter cold air duct
7.2 Natural air exhaust system
   7.21 Thermal actuating ridge opening mechanism
   7.22 Ridge opening screen
   7.23 Ridge closing and restraint spring
7.3 Forced air exhaust fan
8.1 Water circulation and air conditioning system
   8.11 Thermal siphon embeded pipeline loop
   8.12 Thermal siphon top perforated pipeline
   8.13 Thermal siphon riser
   8.14 Thermal siphon electric water heater element
   8.15 Water circulation system water level valve
   8.16 Cooled water trap
   8.17 Water circulation control valve
8.2 Water service system
   8.21 Municipal water supply connection
   8.22 Moat water level valve
   8.23 Interconnecting pipe network
   8.24 Water control valves
   8.25 Sink spigot
8.3 Ridge sprinkler
9.1 Vacuum cleaning built-in collection piping
9.2 Directionally adjustable pollinating air jets
9.3 Common vacuum-blower machine
9.4 Blower distribution piping
10.1 Produce collection, conveyance and concentration system
   10.11 Conveyance pipeline
   10.12 Collection risers
   10.13 Concentration reservoir
   10.14 Reservoir to moat return drain

DETAILED DESCRIPTION OF PREFERRED EMBODIMENT OF INVENTION

With reference to the patent drawings, my invention of Agricultural Greenhousing Reconciling Intensified Urban Methods of operation (herein abbreviated as AGRIUM) comprises, in general: a structural skeleton of reinforced cement grout filled plastic pipe and plastic pipe fittings of interconnected corresponding structural frames 2.1 providing support for and integration with a translucent plastic skin covering 2.5, operation access, and floor and suspended planters 3; said AGRIUM additionally providing support for and integration with the following interrelated systems: a rail-riding service tram system 4; a hydro-nutrient plant feeding system 5; a water storage and utility system 6; an air circulation, filtration and ventilation system 7; a water circulation and service system 8; a vacuum cleaning and air jet pollinating system 9; a produce collection, conveyance and concentration system 10; and miscellaneous appurtenant counter, cabinet, locker, electrical, and lighting service systems.

The structural skeleton of reinforced cement grout filled plastic pipe and plastic pipe fittings of interconnected corresponding structural frames 2.1 comprises: a front structural frame 2.11 having a built-in hinged frame for an entrance 1.2 and the usual frame interconnections 2.2 of bottom beams 2.21, ridge joists 2.22, planter rails 2.23, skin covering lateral supports 2.24 and the non-repeated entry joists 2.25 and is connected to the entrance frame 2.3; a corresponding interior front frame 2.12 of usual frame interconnections 2.2 and non-repeated entry joist 2.25; one or more standard interior frames 2.13; and a rear structural frame 2.14. The structural skeleton can also include intermediate central planter frames 2.15 when and if the spacing between the interior frames is great enough to warrant the additional load bearing frames between such. The unique method of fabbricating the plastic pipe and fittings into the structural frames with reinforcing inserted, if the reinforcing used is steel re-bar, then erecting such on the floor foundation 1.1 and making the frame interconnections 2.2 also with reinforcing inserted and after all necessary additional bolts, screws and plugs are installed, injecting the hollow structural skeleton with cement grout to form a structural integrity of reinforced cement grout protected by a durable form of plastic enclosure which significantly will not corrode, rust, rot or require painting. It is recommended that bolts, nuts, washers, screws, nails or any metal fittings, if possible, be stainless steel (about twice the cost) or aluminum or equal so that the deterioration and depreciation shall consistently be long term. It is possible to use tensile reinforcing of such as fiberglass directly mixed with the compressively strong cement grout for a lighter structural integrity. It is also recommended to use an air-entrained cement grout for better viscosity characteristics to insure complete injection. Although the planter rails 2.23 can form part of the structural skeleton of reinforced cement grout if such are needed, such rails can also be ideal conduits for air, water or electric service systems if such rails are plugged so as not to be filled with reinforced cement grout. The entrance frame 2.3 should also be plugged at the hinge fittings to remain moveable.

The skin covering lateral supports 2.25 of plastic pipe are bolted onto the corresponding structural frames and constitute a separate injection of reinforced cement grout after the skin covering 2.5 has been securely attached with sheet metal screws or the like. For greater insulation an exterior skin covering 2.51 and an interior skin covering 2.52 can be attached to said lateral supports 2.25 forming a dead air space.

With the corresponding structural frames 2.1 containing the corresponding structural cradles it is relatively easy and economical to install suspended planters 3.2 between, on and through said frames. Dependent upon the weight of the planting medium 3.3 and said frame 2.1 spans the planters could be of plastic, wood or lath and plaster or the like. The various borders of the floor planters 3.1 and also the dividers of different level floor planters 3.1 can again be relatively easy and economical to install between and against corresponding structural frames 2.1. In FIGS. 1 through 4 the entirety of the AGRIUM covered space which is useable and will receive adequate sunlight is devoted to planters 3 such as: central floor planters 3.11, deeper side floor planters 3.12, central suspended planters 3.21, side bench planters 3.22, cantilevered hanging planters 3.23 and an attic planter 3.24. Under the sectionally removeable entry platform 1.23 in a cool, well ventilated, relatively dark area, a mushroom planter 3.25 could be suspended which could either or also be used for an earthworm habitat.

The addition of a rail-riding service tram system 4 accomplishes two major improvements: clears the floor planters 3.1 of walkways and provides easy access to all suspended planters 3.2. The operator also is granted the opportunity of riding standing up, sitting or even reclining instead of the old walk, stoop and squat routines. The rail-riding service tram 4.1 is comprised of a tram structural frame 4.11 of reinforced cement grout filled plastic pipe which includes end ladder and scaffold supports 4.12 to enable the operator to climb and stand, sit or recline on a tram moveable scaffold 4.17. The tram 4.1 illustrated is for double passageway service and incorporates at least four tram wheels 4.15 attached to said tram frame 4.11, two wheels 4.15 riding on each of two tram rails 4.2 of reinforced cement grout filled plastic pipe bolted onto said corresponding structural frames 2.1. Also incorporated on the illustrated tram are a bottom platform 4.13 for each passageway and a top platform 4.14 attached to the tram structural frame 4.11 where it connects the passageway structures. For convenience a tram rope and pulley drive system 4.16 is incorporated so that the operator may drive said tram 4.1 by pulling on the rope available on the bottom, sides and top of said tram 4.1. All four wheels are driven by attached pulleys because of the size of said tram 4.1 and it is easily adaptable to an electric motor and pulley drive where the rope crosses on the top platform 4.14. A battery, motor, pulley and a switch would be all that is needed for an electric driven tram 4.1.

Figure 13:
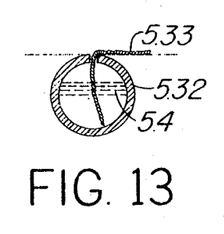
FIG. 13 is a cross-section of a slotted plastic pipe and string capillary hydro-nutrient feeding system.
Figures 14, 16, 17, 18:
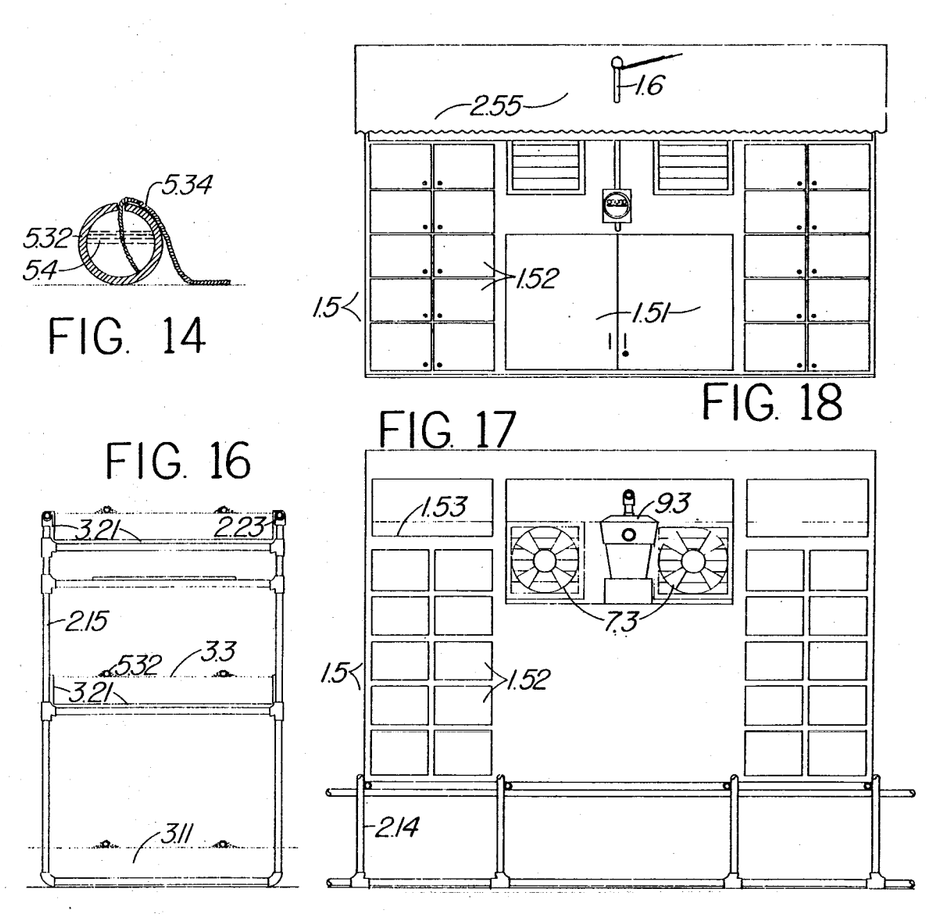
FIG. 14 is a cross-section of a slotted plastic pipe and string capillary and siphon hydro-nutrient feeding system.
FIG. 16 is a front view of an intermediate central planters structural frame of the AGRIUM.
FIG. 17 is a front interior view of a rear service cabinet of the AGRIUM.
FIG. 18 is a rear exterior view of a rear service cabinet of the AGRIUM.
Figure 15:
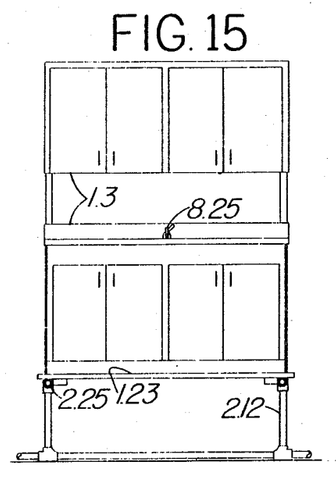
FIG. 15 is a front view of an entry service counter and cabinet of the AGRIUM.

For purposes of using soilless agriculture a hydro-nutrient plant feeding system 5 is included which with soil could be used as an automatic irrigation system. The major reason for using soilless planting mediums 3.3 such as sand, peagravel, vermiculite or pearlite is that wet soil is called mud which besides caking, packing, clodding and sticking usually contains numerous vermin and weed potentials. Some sandy loams might disqualify most of the latter negatives but even so would be better used by a hydro-nutrient plant feeding system 5. The hydro-nutrient plant feeding system 5 incorporates elevated storage and mixing tanks 5.1 connected through control valves 5.24 and at least one automatically timed and sequenced solenoid valve 5.22 to a gravity vertical distribution system 5.2 which is a vertical piping network 5.21 with ending adjustable flow valves 5.23, said flow valve 5.23 partially filling the planter horizontal distribution systems 5.3 consisting of horizontal slotted pipelines 5.31 and string capillary plant feeders 5.33 or string capillary and siphon plant feeders 5.34 or both. The string plant feeders are inserted in the slotted pipe 5.32 so that the hydro-nutrient contained will wet and climb the string by capillary action and be assisted further by siphon action. Such a system is easily variable by size, length and compactness of the string and number of strings and the hydro-nutrient and planting medium elevations, with comparative observation of plant growth an easy indicator of effectiveness. A control group of plants with measured moisture content of the planting medium provides a good reference system. If some operations with certain plants excessively disturb the string plant feeders and such are continuously coming out of said slotted pipe 5.32, then a knot or so in the string within said slotted pipeline 5.32 could serve as a restraint or even a prohibition against coming out. Said hydro-nutrient plant feeding system should operate on time intervals such that the best range of moisture content of the planting medium is maintained while also allowing for aeration of roots.

While the structure, skin, floor and suspended planters, and service tram optimize the available sunshine, the hydro-nutrient plant feeding system suggest the need to optimize the utility of another resource variously known as precipitation, rain, snow, sleet but hopefully not large hail for obvious reasons. This suggestion is fully encompassed by a water storage and utility system 6 of moat 6.11, pond 6.21 and cistern 6.31 coupled with a water circulation and service system 8 and even an aquatic produce collection, conveyance and concentration system 10. With the inclusion of the aquatic systems there is also the inclusion of the protective and beneficial summer fences and winter covers and even a ridge sprinkler 8.3 to protect against the detrimental effects of climate and environment while simultaneously turning to benefit any useful effects. Interfaced and integrated with the aquatic systems is an air circulation, filtration and ventilation system 7 which when so coupled provides for air conditioning in the forms of summer cooling, winter heating, adequate air circulation and ventilation and even humidification.

With the inclusion of the moat systems 6.1 also comes the potential of raising aquatic life such as fish, quiet frogs, turtles and not only excluding from the AGRIUM any significant invasion of insects but also allowing conversion of any such threatening invaders to more palatable protein. The moat 6.11 includes a body of water encircling the AGRIUM at its perimeter and is of optimum utility when said moat is inside, under and about said AGRIUM. The moat foundation 6.12 is illustrated to be reinforced concrete preferably installed by guniting or lathe and plaster methods, said moat foundation 6.12 adjoining the AGRIUM floor foundation 1.1 on the inside, covering the moat excavation and culminating on the outer perimeter as a border providing support for the moat fence-cover frame 2.41. The excavated material for the moat is best utilized as fill under said floor foundation 1.1 to raise said floor above ground level. Moat overflow ports 6.15 are included in the perimeter border to distribute the precipitation overflow about the moat and insure that the AGRIUM floor is not flooded. With the inclusion of raising aquatic life also comes the need for moat dividers 6.13, moat breeder and service tank 6.14, moat circulation pipelines 6.16, moat aeration apparatus 6.17 and moat divider valves 6.19. Said aeration apparatus 6.17 is illustrated as an air pumping method for circulating aerated water via said moat circulation pipelines 6.16.

Figure 1:
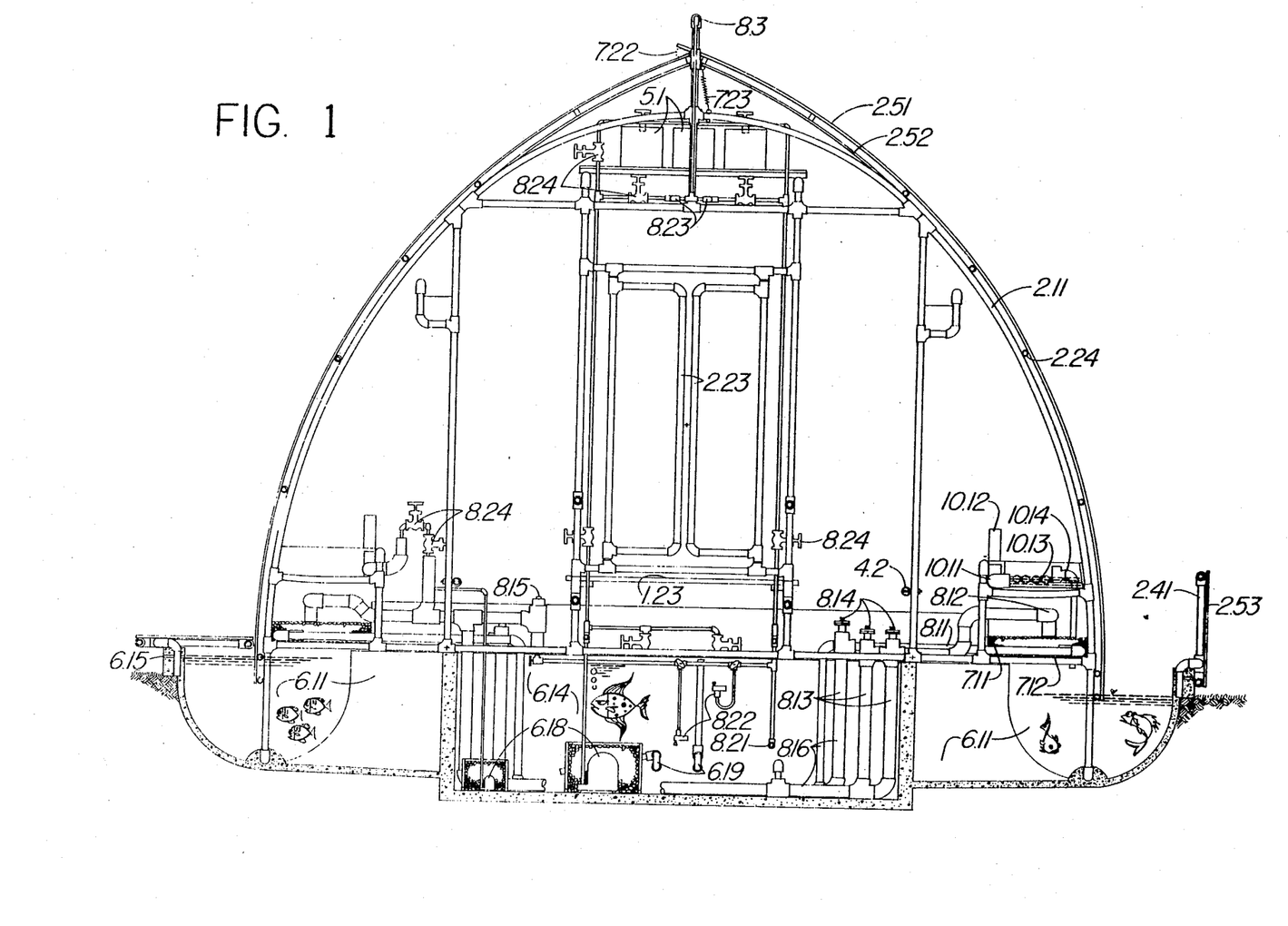
FIG. 1 is a front view of a front structural frame and appurtenances of the AGRIUM.
Figure 2:
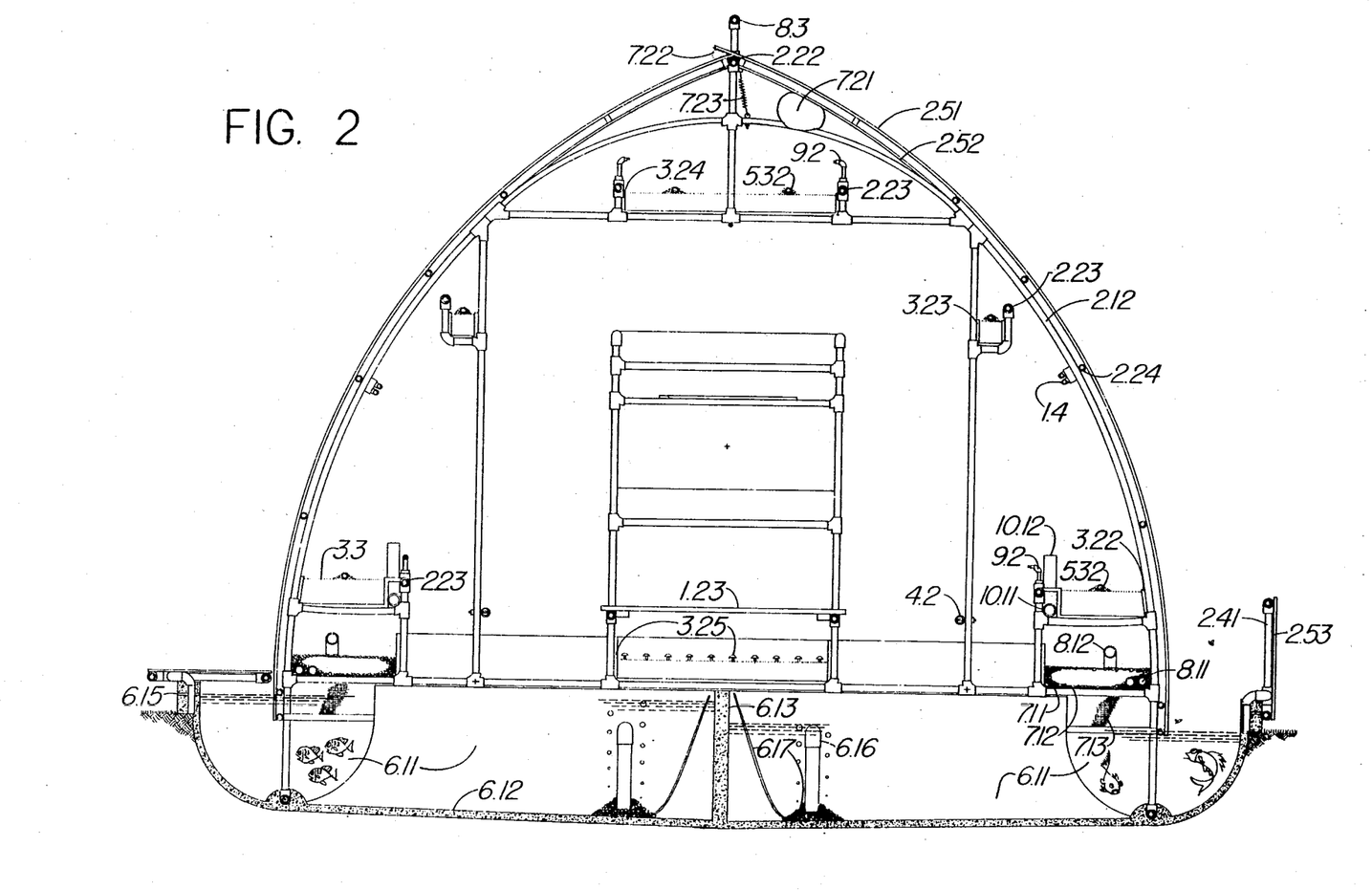
FIG. 2 is a front view of a second structural frame and appurtenances of the AGRIUM.
Figure 3:
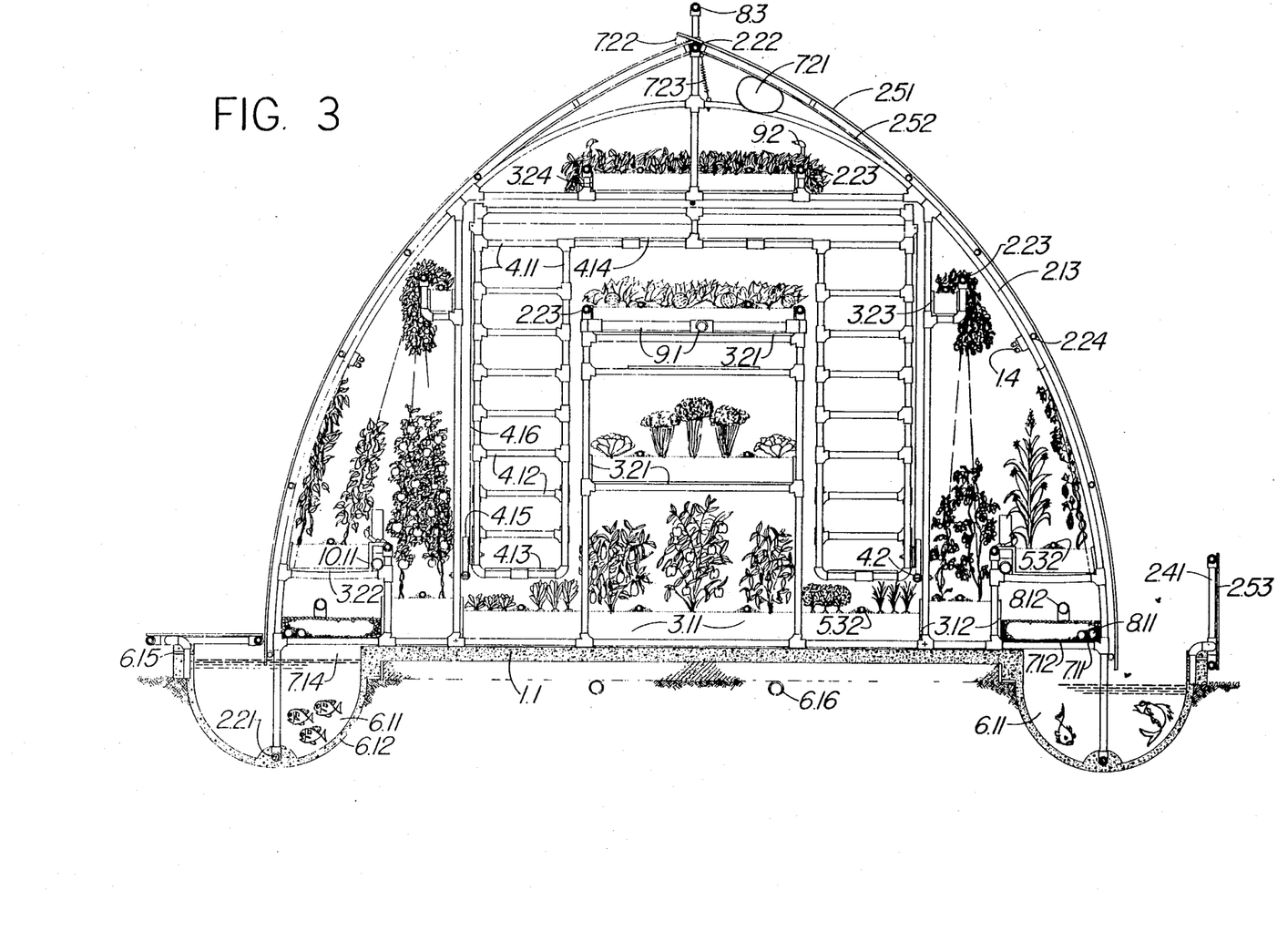
FIG. 3 is a front view of a standard interior structural frame and appurtenances of the AGRIUM.
Figure 4:
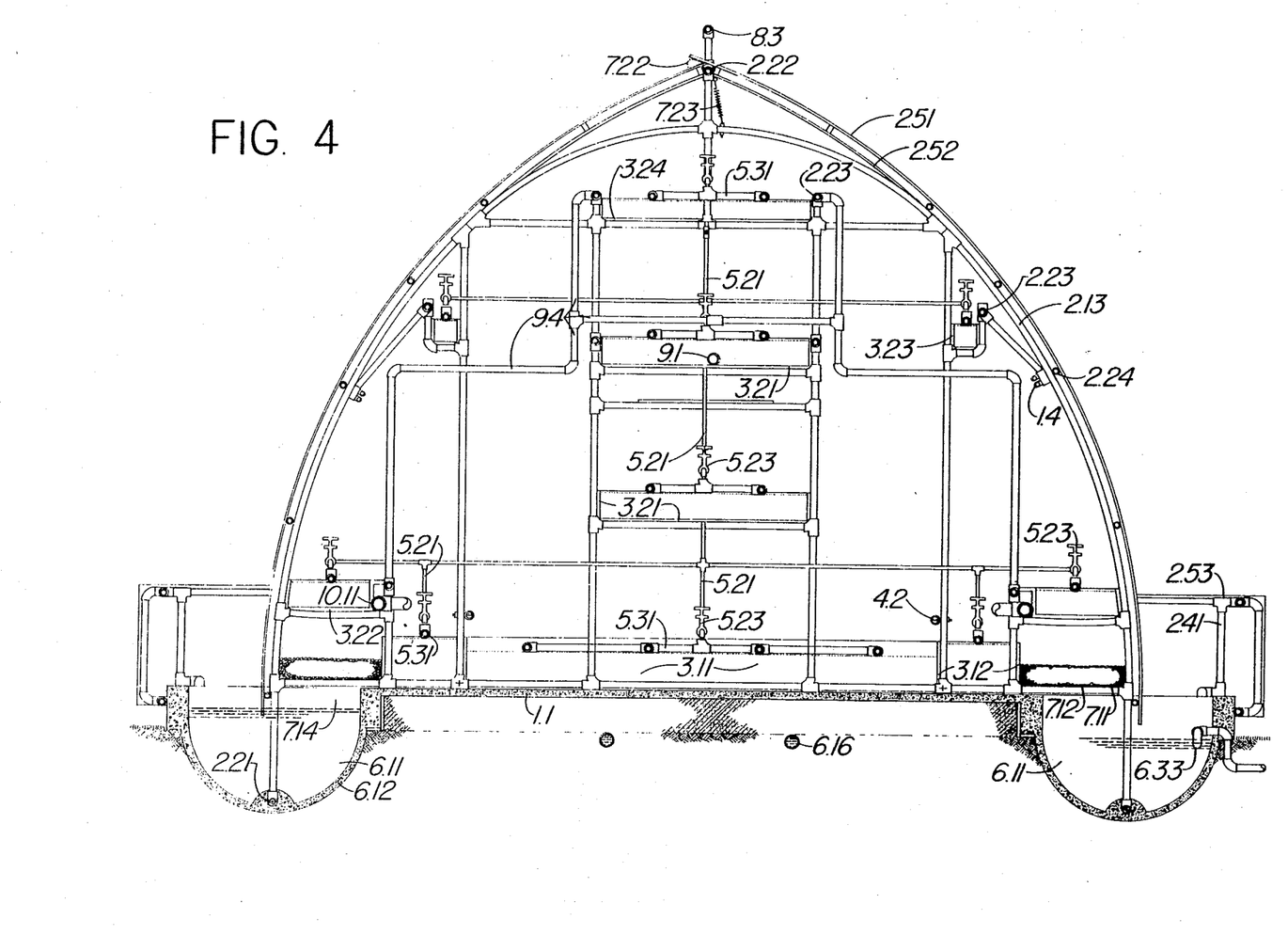
FIG. 4 is a front view of a rear structural frame and appurtenances of the AGRIUM.
Figure 5:
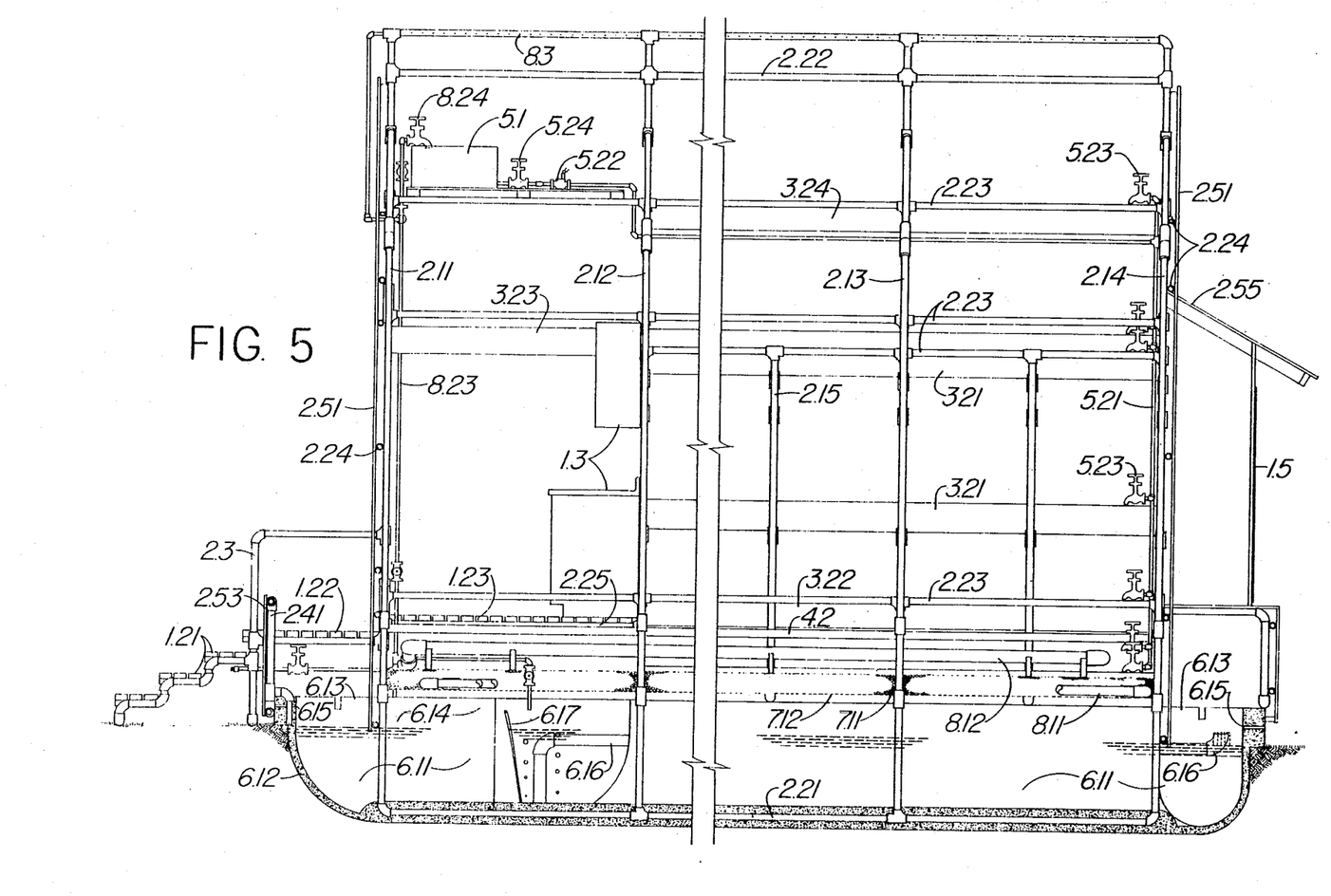
FIG. 5 is a side view of a structural skeleton and appurtenances of the AGRIUM.
Figure 6:
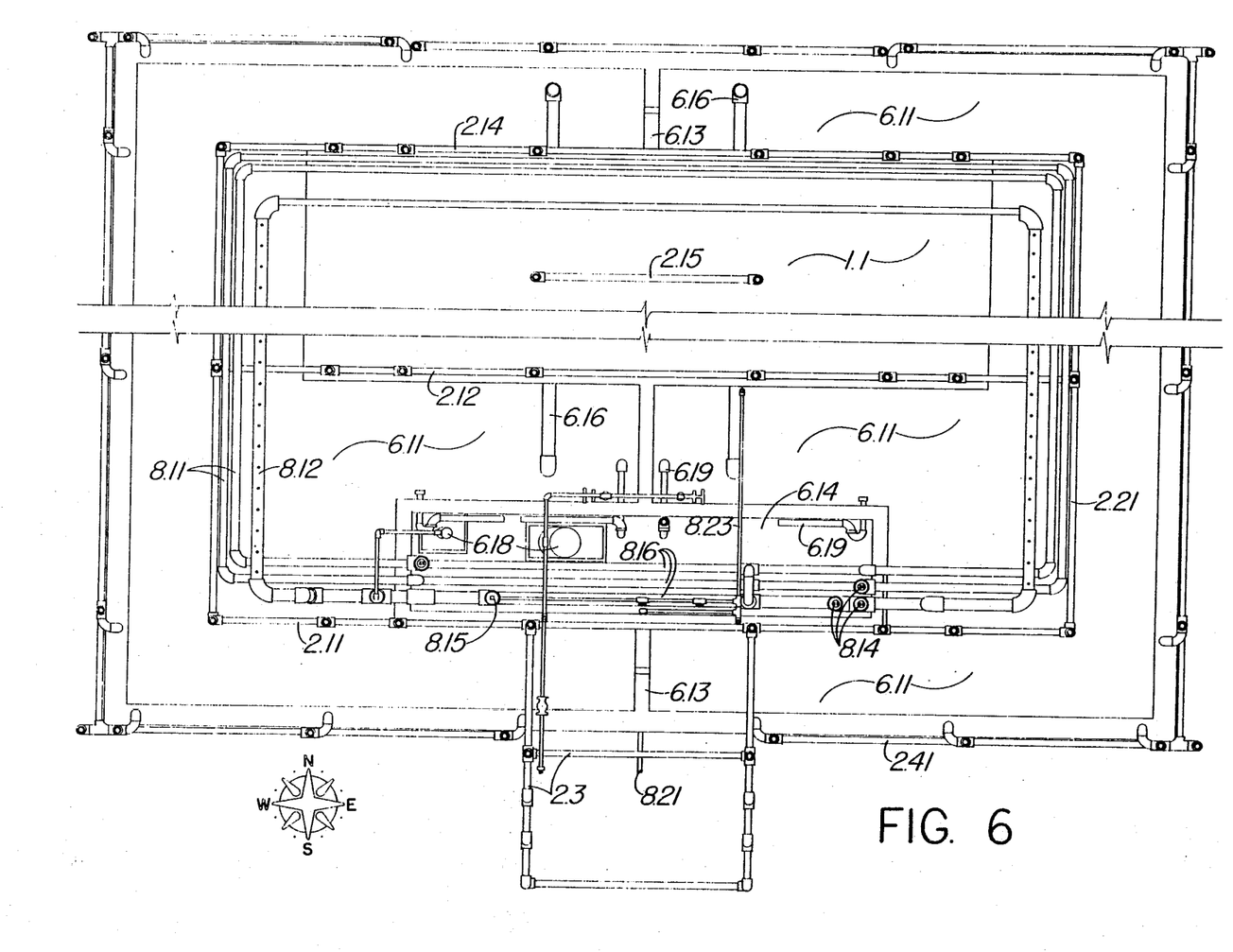
FIG. 6 is a plan view of a structural skeleton foundation and appurtenances of the AGRIUM.
Figure 7:
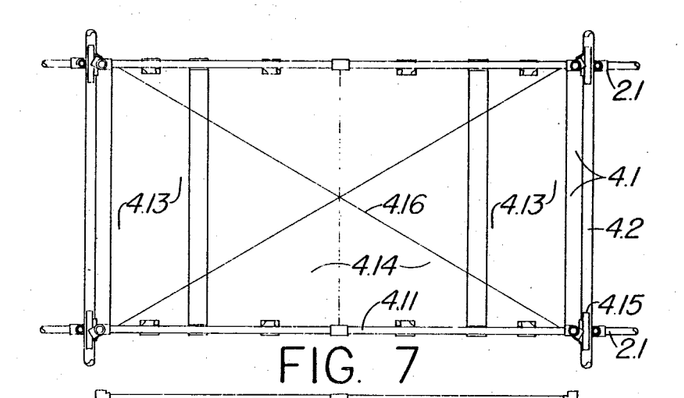
FIG. 7 is a plan view of a rail-riding service tram of the AGRIUM.
Figure 8:
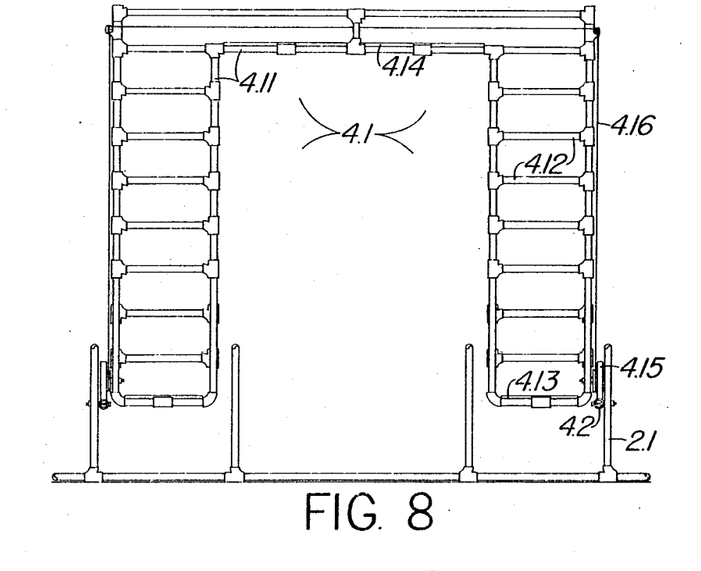
FIG. 8 is a front view of a rail-riding service tram of the AGRIUM.
Figure 9:
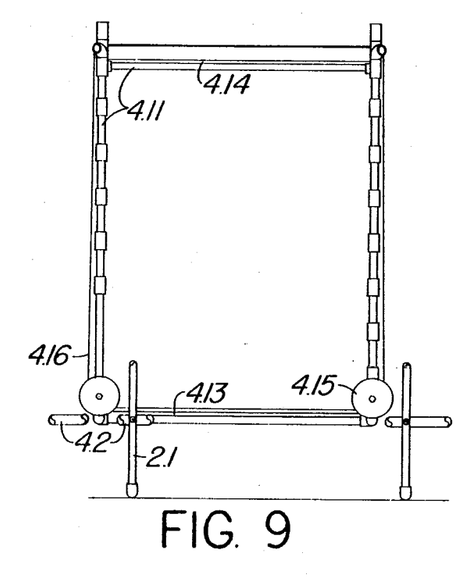
FIG. 9 is a side view of a rail-riding service tram of the AGRIUM.
Figure 10:
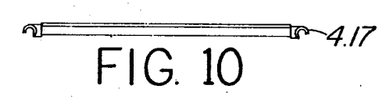
FIG. 10 is a side view of a tram scaffolding.
Figure 11:
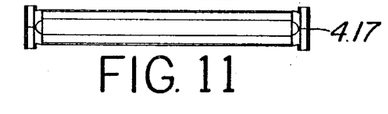
FIG. 11 is a bottom view of a tram scaffolding.
Figure 12:
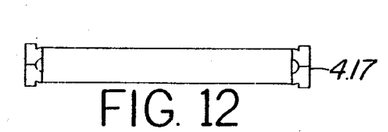
FIG. 12 is a top view of a tram scaffolding.

As is illustrated in FIGS. 3 through 4 the moat water levels are variable to allow summer ventilation as shown on the right with the hinged summer fence open and to allow winter closure as shown on the left with the hinged winter cover closed. The moat summer fence-winter cover is comprised of fence-cover frames 2.4 which are especially designed as hinged moat fence-cover frames 2.41 of plastic pipe and plastic pipe fittings covered with a moat fence-cover skin covering 2.53 of plastic. In the summer or warm weather the fence-cover is swung upright and corner sections are inserted to secure said upright position, said summer fence protecting the moat from dogs, cats, kids and the like or vice versa. In the winter or cold weather the fence-cover is swung down by removing the securing corner sections and the outside moat is protected from dogs, cats, kids and the excessively cold weather. In the summer the moat fence allows air ventilation under the AGRIUM skin covering, whereas, in winter the moat cover and moat water level seal the AGRIUM against such undesirable cold air entrance. While the winter moat fence-cover skin covering 2.53 does not completely seal against the AGRIUM exterior skin covering 2.51 so that precipitation may still drain off the AGRIUM skin covering 2.51 into said moat 6.11, the opening is not sufficient to allow much cold air contact with the moat water.

In conjunction with the variable moat water level is the air intake, circulation and filtration system 7.1 comprised of an aggregate air filter 7.11, said aggregate being loosely placed over an aggregate air filter support mesh 7.12 of a rust resistant metal mesh, said mesh being suspended between the corresponding structural frames along the sides of the AGRIUM inside the skin covering 2.5 and directly over the inner perimeter moat 6.11. During the summer with the moat water level down the air flows under the skin covering 2.5 and into the AGRIUM through the aggregate air filter 7.11 except where the inside moat is still sealed off by the low water level because air entering such if permitted would not have to flow through said air filter 7.11. There is a summer insect screen 7.13 between the sealed and open air flow intake through which air may flow but not through which insects may go. During the winter with the moat water level up, the intake of outside air is prohibited but the flow of inside air is allowed through the winter cold air duct 7.14 which is formed by the inner moat wall, the moat water level, the skin covering and the aggregate air filter. This would allow the coldest air in the AGRIUM just above the inside water to flow under said aggregate air filter and if such filter was warmed then the coldest air would rise through said filter as it too was warmed.

Embedded within and resting on top of said aggregate air filter is the water circulation and air conditioning system 8.1 comprises of: a thermal siphon embedded pipeline loop 8.11 in the aggregate air filter 7.11; a thermal siphon top perforated pipeline 8.12 setting on top of said filter 7.11; at least one thermal siphon riser 8.13 coupled to another riser by a bottom lateral to form a cooled water trap 8.16 resting in but not directly hydraulically connected with the moat; a thermal siphon electric water heater element 8.14 inserted in the top of said thermal siphon riser 8.13; a water circulation system water level valve in said circulation piping to maintain a minimum water level in said top perforated pipeline above said electric water heater element level but below said top perforations and a moat pump 6.18 for pumping moat water up and into said water circulation system to cause said top perforated pipeline 8.12 to spill water upon said aggregate air filter 7.11. Still utilizing plastic pipe and fittings where possible, it is noted that the conduction of heat through said plastic pipe walls is not as great as through metal pipe, and so the spill of heated or cooled water directly upon an aggregate air filter of gravel or light weight aggregate conveys to a very porous medium the heat or cold by direct contact, said medium being in direct and extensive contact with the air. Even if no heating or cooling is required but only an increase in humidity then the spill can accomplish such readily. As the moat water on the bottom will usually be cooler than the air, the spill over the aggregate would cause some evaporative cooling. Thus the moat pump and electric water heating element should be controlled by a thermostat for winter heating and the moat pump should be controlled also by a thermostat for cooling and a humidistat for humidity.

Acting in conjunction with the aggregate air filter and water circulation system during warm weather is a thermally actuated upper air exhaust means which is a natural air exhaust system 7.2 comprised of, as illustrated: a thermal actuating ridge opening mechanism 7.21 which can be a basketball that increases in internal pressure when warmed; a ridge opening screen 7.22 to deny entrance to flying insects and a ridge closing and restraint spring 7.23. While applicant has devised this system there is an economically competitive system of turbine ventilator coupled with a thermostatically controlled damper available which also utilizes the wind and therefore applicant shall try such first in the construction of his original model. Should either system not supply the ventilating flow required then a thermostatically controlled forced air exhaust fan 7.3 is included.

With some aquatic and hydro-systems introduced, it becomes apparent that water service systems 8.2 including a municipal water service connection 8.21 to provide treated water and drought security is a reasonable precaution. With a service counter and storage cabinets 1.3 including a sink it would be appropriate to connect the sink spigot 8.25 to said treated water and let the water drain into the moat through a sand filter bucket. Because as much use of captured water supply as possible is dictated by economy, there is an interconnecting pipe network 8.23 with water control valves 8.24 that interfaces a moat pump 6.18 with said municipal water service connection, which could possibly include an elevated storage tank, standpipe or a pressure tank to also serve the moat water level valves 8.22 and fill the hydro-nutrient tanks 5.1 and supply the ridge sprinkler 8.3. The ridge sprinkler 8.3 is illustrated to be connected to a moat pump 6.18 thermostatically actuated by a skin covering sensor, said thermostat set to turn on when the skin covering reaches a specific warm temperature, said ridge sprinkler sprinkling the skin covering with water that absorbs heat from said skin for evaporative cooling in summer, solar heating moat storage in winter, and fire protection continuously. Said sprinkler could also be manually actuated for snow and ice removal from the skin covering.

The incorporation of moat, aggregate air filter, water circulation system with the summer evaporative cooling-winter solar heating pond systems 6.2 and the precipitation or rainwater and thermal storage cistern system 6.3 top off the air conditioning and precipitation storage systems. The pond systems 6.2 and cistern system 6.3 are comprised of: a pond 6.21 set on top of a cistern 6.31; a summer fence-winter cover 6.22 secured in the perimeter pond walls 6.29 of a pond fence cover frame 2.42 of hinged plastic pipe and plastic pipe fittings covered by a pond fence-cover skin covering; a pond sprinkler system 6.23 with the sprinklers about the inner perimeter of said pond and pointing inward to a centerline of said pond 6.21; a pond water circulation flow through trough 6.25 along said centerline and hydraulically connected and level with said thermal siphon top perforated pipeline 8.12 through a water circulation control valve 8.17 at one end and through another water circulation control valve 8.17 at the other end through a pipeline dipping down into said cistern 6.31 and moat 6.11 and connected to the bottom of said thermal siphon riser 8.13; a pond drawdown siphon to cistern 6.24 perferably adjustable in siphon starting elevation and pond drawdown elevation; a pair of valved pond water circulation system injection jets 6.26 having nozzles pointing into the ends of said flow through trough 6.25 towards said water circulation system control valves 8.17; a pond-moat water level valve 6.27 for keeping the moat at a desired water level; a variable level moat to cistern drain 6.33 also for keeping the moat at a desired water level; a cistern water level guage 6.38; a cistern access 6.37 for maintenance and repair; a pair of cistern pumps 6.32 one connected to said pond sprinkler system 6.23 and the other connected to said circulation system injection jets; and said cistern bottom 6.34, cistern walls 6.35, cistern top 6.36, pond bottom 6.28 and pond walls 6.29 being of reinforced concrete with said cistern top 6.36 also being said pond bottom 6.34.

Figure 21:
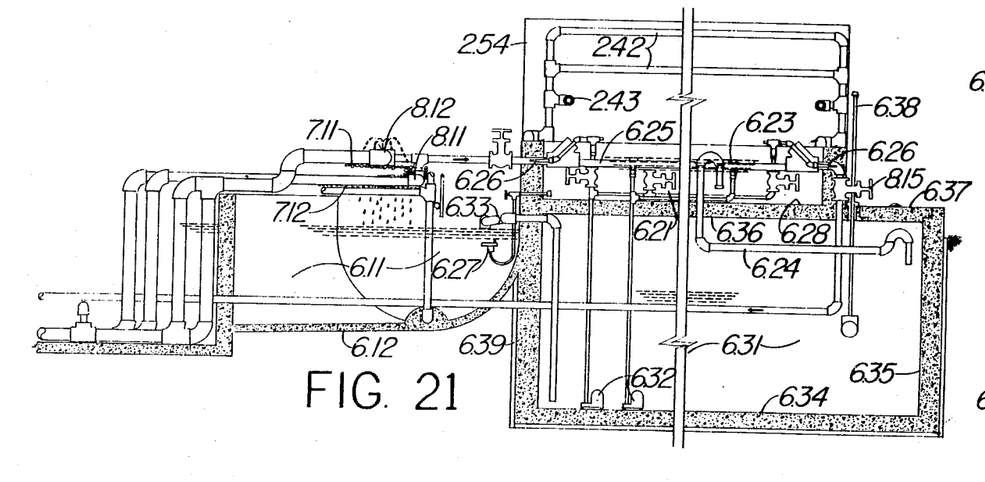
FIG. 21 is a side cross-section of said pond and cistern interfaced with the AGRIUM illustrating the summer or cooling conditions.
Figure 22:
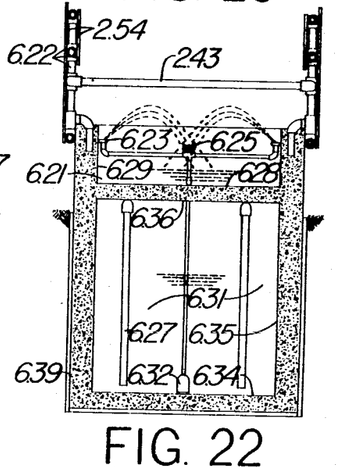
FIG. 22 is an end cross-section of said pond and cistern illustrating the summer or cooling conditions.

In the summer with said pond hinged fence-cover upright and held in place by pond fence summer brace 2.43, the sprinkler system is fed by one cistern pump actuated on a timed interval every night and whenever the injection jet system is thermostatically activated, said sprinkler system cooling the retained water and filling said pond until said pond drawdown siphon to cistern 6.24 is actuated and, being of greater quantitative flow than said sprinklers, draws said pond back down to a preset level dumping the cooled water into said cistern and then continuing to repeat said cycle. The sprinklers preferably are set to stay within said pond and also keep said flow through trough 6.25 filled with cooled water thus allowing the thermal siphon circulation system to flow naturally whenever the thermal differential exists in the water of said system. When the AGRIUM thermostatically controlled cistern pump connected to the injection jet is activated, both systems come on, the injection jet forcing the circulation water flow and creating sufficient head to cause said top perforated pipeline to overflow onto said aggregate filter, thus increasing the cooling. The summer systems are illustrated in FIGS. 21 and 22, and as can be traced there is a continuing mix of moat, pond and cistern with an extensive gravel filter which pursues appropriate stability of both water and air temperature in moat and AGRIUM.

Figure 19:
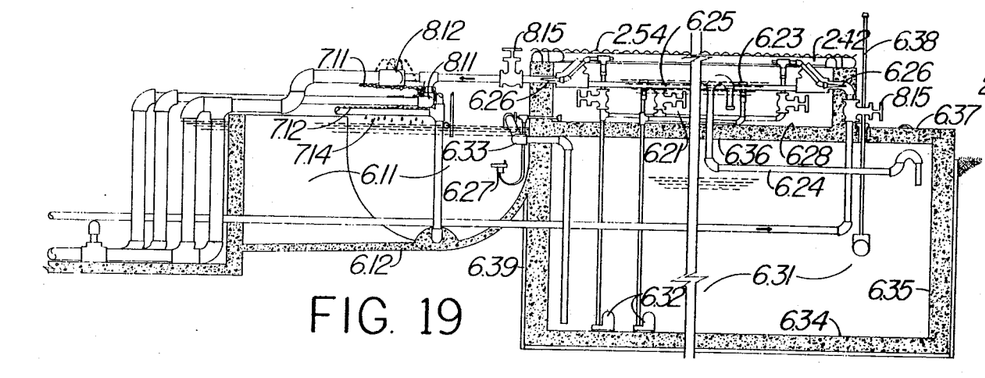
FIG. 19 is a side cross-section of a summer evaporative cooling-winter solar heating pond and rainwater and thermal storage cistern and appurtenances interfaced with the AGRIUM illustrating the winter or heating conditions.
Figure 20:
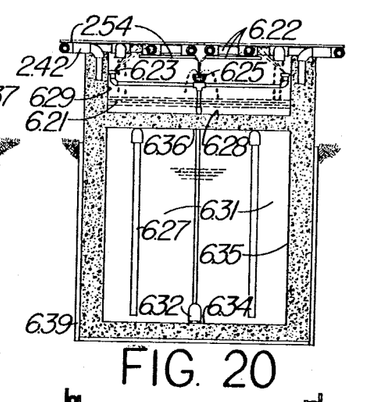
FIG. 20 is an end cross-section of said pond and cistern illustrating the winter or solar heating conditions.

For the winter, the pond fence summer braces 2.43 are removed and the hinged pond summer fence-winter cover 6.22 is closed over said pond after a water control valve is closed on the summer circulation injection jet and a water control valve is opened on the winter circulation injection jet, the summer and winter water circulations being reversed. During the winter the sprinkler system is actuated by a solar radiation thermostat, with the spray being deflected by a pond fence-cover exterior skin covering 2.54 into an open trough half pipe of of the black pond fence cover frames 2.42 for solar heat absorption circulation within said frame and return to said pond, and also onto an interior blackened partial skin covering 2.54 for solar heat absorption and spill into said centerline flow through trough with overflow to said pond. Again when the AGRIUM thermostat activates the winter injection jet, the water circulation flow is forced and a sufficient head is created to cause warm water in the top perforated pipeline to overflow onto said aggregate filter. The sprinkler system is not activated by said AGRIUM thermostat because there would be a loss of stored heat if such system came on at night or when overcast. The pond drawdown siphon to cistern still cycles the solar heated pond water into cistern storage, and if said sprinkler system turned off when the hydraulic connection between the pond and the flow through trough was broken, then a third partially open adjustable water control valve to the pond in the injection jet system would slowly refill the pond and reinstate said hydraulic connection. This same control valve is originally adjusted so that the head on the perforated pipeline will not spray the water to high and the least pressure load will be imposed upon the cistern pump.

During the transition periods between summer and winter it is preferable to retain the winter configuration of storing solar heat in the cistern since the interior system of moat pump to perforated pipeline can easily provide what little cooling demand is made, and conversion of winter heat storage to summer cool storage can be effected more rapidly. Within the air conditioning systems every effort has been made to alleviate the use of electrical energy by relegating such as the forced air exhaust fan 7.3 and hot water heating element 8.14 to topping off systems needed only in the severest weather. The ridge sprinkler moat pump will be used most sparingly also since it is the largest of the pumps.

The use of a vacuum cleaner for periodic cleaning operations implies that a blower is also available for use and the need to perform some daily pollinating arises to replace the bees and butterflies. A blower side of a vacuum cleaner is sufficient to provide such air flow as to air brush the flowers with directionally adjustable pollinating air jets 9.2 without damaging disturbance. The planter rails 2.23 of the attic and side bench planters if left hollow make ideal blower distribution piping 9.4 upon which to install said air jets 9.2. Providing vacuum cleaning built-in collection piping 9.1 in the top central suspended planter bed with fitting accesses available on each side of said planter improves the convenience when the collection piping is inserted into the vacuum side of a common vacuum-blower machine 9.3 and said blower distribution piping is inserted into the blower side. This leaves the machine stationary when the vacuum cleaner is manually activated and used for cleaning operations, and requires no alteration other than leaving a couple of vacuum cleaning collection piping unplugged for air input when the blower is activated on timed, sequenced intervals.

With no alteration other than burying one of the air jets in the bottom drainage gravel of a sand covered planter, a root aeration system is included in the timed, sequenced intervals and provides a gentle infusion of air throughout a whole planter. While no experience regarding a forced cycle of water, nutrient and then air has been had, it would appear that no detrimental effects would occur and that such forcing applied in a gentle persuasive way would possibly accelerate the growth rate of many plants. Should any actual drain be required on any planter it would be necessary to provide a slight water trap so that such aeration would not escape through said drain.

An additional convenience with the manually activated use of a moat pump is the produce collection, conveyance and concentration system 10.1 consisting of a horizontal conveyance pipeline 10.11 forming an open loop with open collection risers 10.12 from the moat pump source around the perimeter of said AGRIUM to a concentration reservoir 10.13 having a reservoir to moat return drain 10.14 such that the water introduced by the moat pump flows slowly around to said concentration reservoir taking the floating produce deposited in said risers to said concentration pond, said water then draining back to said moat. With such produce as tomatoes, bell peppers, berries and the like which are usually picked in quantity, the deposit of such in open risers that may even have moveable extensions is practical and, by the use of gently sloping wye and elbow fittings, will deliver such to a cushioning flow of water without bruising such produce. This is a reason the illustrated pipeline is placed on the side bench planters support along with the use of one end of such planter as a concentration pond.

While there are several small automated systems that may increase the convenience such as a moat skimmer for removing leaves and inedible floating debris, a water filter to remove the silt, and some fish feeders, it is not intended to remove the human operator by automation, only to assist said operator in producing the best quality and quantity with the least effort.

OPERATION

Having heretofore introduced in depth by illustration, index and detailed description the structural and internal operative systems of the agricultural greenhousing, this discussion will generally be directed toward the reconciling of intensified urban methods of operation. Although the introduced agricultural greenhousing could be practical and feasible in a rural setting and possibly economically competitive with its urban counterpart if large units specializing in one type of crop could still do the extra packing, shipping, refrigeration and supermarketing at almost no cost. As for getting the corn from stalk to diner table in less than an hour, the only competitor is the urban garden which being seasonal, is a short time server with bugs.

While any urban or suburban area that is zoned residential may justifiably object to a commercial establishment serving all of or any of the public in its midst, especially if it looked like the presently existing greenhousing, however, should agricultural greenhousing like the AGRIUM be constructed and utilized to serve its own neighbors by subscription or membership then the lack of disturbing public traffic coupled with quality and economy of the produce and the quality of said AGRIUM may bring to the cities some of the essence of country cordiality.

As the immigration has been from rural to urban, a return to the farm would, no doubt, be a retreat, however, bringing some of the farm to town could be an improvement and an expansion of pleasant activity.

The rural children had chores and responsibilities, but when first moved to the cities and the factories, there rose such a bitterness of abuse of over worked, under paid and under fed children, that laws were passed leaving many urban children idle and irresponsible. The AGRIUM requires that the neightbors pick up their own orders or that someone deliver them. Perhaps a small re-advance can be achieved if the city children, not only under close parental watchfulness but also the scrutiny of neighbors, could assume and reasonably profit by the chores of delivery. Some values that have been lost, sorely need recovering, and a major one is the childrens' value of themselves.

As for the nearest neighbors or those who like to walk or jog, the rear service cabinets 1.5, besides containing that electric service and controls cabinet 1.51 also contains some patron lockers 1.52, into which an order can be put, and out of which can later be taken the produce ordered.

Having already obtained for the original AGRIUM the bulk of the controls and systems, the corrugated two layered translucent plastic, and plastic pipe and fittings; the materials will approach a cost between three and five dollars a square foot of interior floor space, assumed to be equal to the labor cost of construction. Assuming a high cost of electricity, water, nutrient, maintenance, repair and replacement of two dollars a square foot per year of floor space and operating labor cost of five dollars per square foot per year of floor space. Within present hydroponic or hydro-nutrient experience, about 36 pounds of greenfood per square foot of planting area per year can be produced, which figuring an average price at twenty five cents a pound yields a planter income of nine dollars per square foot of planter per year. As the AGRIUM has at least planter space of 1.5 times the floor space the income per square foot of floor space becomes thirteen dollars and fifty cents per square foot per year. The economic analysis per square foot of floor space per year is as follows:

| | |
|---|---|
| Gross income | $13.50/sq. ft./yr. |
| less operating labor cost | 5.00 |
| | 8.50 |
| less utilities, MR&R, MR&R, nutrient cost | 2.00 |
| Net income | $6.50/sq. ft./yr. | with the kids getting about one dollar per square foot of the operating labor cost, then with the owner as the operator the remaining operating cost and net income is ten dollars and fifty cents per square foot of floor space per year. If the owner is the builder the materials cost can be paid off the first year and still leave five dollars and fifty cents per square foot of floor space per year to the owner.

Because the five dollars per square foot of floor space for materials includes the full complement of the AGRIUM, the moat can be included for raising or just holding of tropical fish, quiet frogs, turtles, crayfish, minnows, catfish or the like. Assuming catfish are raised to supply patrons with some fresh fish, the moat illustrated will provide about 20 cubic feet of water per running foot of AGRIUM, said water being circulated and aerated and preferably kept between a temperature range of 60° to 90° F. with the best range being in the high eighties for catfish growth. In a regular farm pond a 36 cubic foot cage can be used to raise 500 fingerlings to one pound average size and about a 30 percent increase is possible with aeration and circulation, so about 650 fingerlings can be raised to one pound in 20 cubic feet of moat water or per running foot of AGRIUM.

Assuming the cost of the fingerlings at five cents each and also assuming that all feed, worms or nourishment is provided by the AGRIUM and environs mostly by use of otherwise wasted organic matter and a price of only fifty cents per pound for catfish, the net would be forty five cents per pound times 360 which is one hundred sixty two dollars a running foot of AGRIUM or relating this cost to the illustrated AGRIUM of twenty foot width the net addition of income is eight dollars and ten cents per square foot of floor space and it appears from the available literature that around two years is required to grow one pound catfish. The latter analysis is presumed to be intensified to the maximum, both in fish density and recycling of all useful organic matter.

While there have been many critics of the suburban sprawl, some even implying that it would be great to package, box and stack everybody else in large structures with efficient service systems for some rather vague and mysterious purposes, perhaps so said critics can have the rest of the wide open spaces for themselves, it simply appears to this inventor that humanity just likes to sprawl all over the place. Having observed and noted the veracity of this trend of civilization it seems more appropriate to reconcile the other needs to this trend. Thus, the origination of the AGRIUM is with the tide, not as a hobbyist's dream, but specifically tailored to fit with and feed the urban and suburban populations. Some populations in the cities are already undernourished and starving and some cities have and are economically suffering with a greater outpouring of funds to other environs than is incoming. Putting some farming in the cities' backyards would recycle funds within in addition to providing food.

The AGRIUM illustrated has an interior width of about twenty feet and with the moat is about twenty five feet wide which can readily fit in the back yard of a forty to sixty foot wide residential lot. The AGRIUM illustrated has corresponding frames that are set on six foot centers so that the practical modular sizes would be about a minimum of twenty four or thirty feet long and the maximum would depend on the backyard length. As an electrical systems package is roughly the same for any size the cost is better distributed over a larger AGRIUM for economy. The AGRIUM illustrated is considered the optimum height and width for backyards, human operator convenience and utility, and intensification of vegetable, flower and aquatic life production, however, the growing of dwarf fruit trees in the side floor planters will require further dwarfing, non-symetric pruning and still crowd the illustrated space. This inventor has by doubling the width of the illustrated AGRIUM also designed a double tram, four passageway AGRIUM that not only has a center planter adequate to house existing dwarfed trees with a service tram passageway on each side, but also of optimum size to fit and even utilize a whole residential lot, preferably an eastern corner lot with the length in a north-south orientation. Perhaps the older urban areas would require renewal before such could be incorporated, but new developments could specifically designate such lots for AGRIUM utility and specify the restrictive applications, operations and qualifications thereof. The larger AGRIUM being of a total width of about forty five feet could still fit in many backyards but there would be little room for pretty grass or noisy dogs.

The operating AGRIUM would be anti-non-polluting in the conversion of carbon dioxide to oxygen; make less noise than a central air conditioning unit; produce much less fumes, molds and bacterial smells because of excellent air circulation and ventilation than a garage, and enhance the looks of any neighborhood by decorative utility and activity with less stone throwing.

For ease of illustration the drawings show the breeder and service tank with various appurtenances only in the front, however, such may be easily and economically incorporated in the rear of said AGRIUM by enlarging the width of the rear moat towards the inside. With the electric service definitely in the rear on the original AGRIUM, this relocation is economically desirable. Also the drawings illustrate a sloped floor foundation for drainage purposes, however, a bottom layer of coarse gravel on a level floor foundation in the floor planters is quite adequate and of easier construction.

ADVANTAGES

It is a major advantage of the invention to integrate the food producers and consumers in the same urban environs to the extents of enjoyment and enhancement for both, and to the detriment or depreciation of neither.

A further advantage of the invention is the conservation of energy and available resources of sun; precipitation; natural circulations of air and water; and redeeming utility of available, enthusiastic, enlightable, young inhabitants.

A still further advantage of the invention is to accomplish the aforementioned advantages economically, feasibly, practically and actually.

Although this specification describes and illustrates but one embodiment of the invention with certain modifications thereof, it is understood that structural or material rearrangements of adequate or equivalent parts, substitution of equivalent parts and other modifications in structure can be made and other applications devised without departing from the scope of my invention. I therefore desire that the description and drawings herein be regarded as only an illustration of my invention and that the invention be regarded as limited only as set forth in the following claims, or as required by the prior art.

Thus having described my invention, I claim:

1. A greenhouse comprising a structural skeleton of interconnected frames of reinforced cement grout filled plastic pipe and interconnecting plastic pipe fittings mounted on a floor providing support for and integration with a securely attached translucent plastic skin covering and suspended horizontal riding operator access over said floor and between suspended planters, with electrical and water supply means included and further including a sequenced and timed interval hydronutrient system incorporating elevated storage and mixing tanks supplying by gravity a vertically adjustable, valved hydronutrient distribution network in fluid communication with horizontal planter pipes containing capillary and siphon distributors, said system being adapted to deliver hydronutrients to plants in said planters upon timed activation of a solenoid valve in said vertical network.

2. The greenhouse described in claim 1 wherein said operator access comprises a rail-riding service tram with a bottom platform above a floor planting area and with climbable, scaffold-supporting ends of a reinforced cement grout filled plastic pipe and interconnecting pipe fittings tram structural frame, said tram also including wheels riding on at least two rails of reinforced cement grout filled plastic pipe supported by said structural skeleton, said wheels at least drivable on the rails by a hand pulled rope and pulley system accessible on the side, top and bottom of said tram, said tram providing a riding operator with ready access to all planting areas, both floor and suspended.

3. The greenhouse described in claim 1 additionally providing support for and integration with a built-in plastic pipe vacuum cleaning collection system incorporated with a sequenced and timed interval, air jet pollinating and root aeration system using some plastic pipe rails of said suspended planters for the air expelling distribution network, said air jets being directionally adjustable and expelling pollinating jets of air and injecting air into the bottom of said planters provided by a common vacuum-blower machine automatically actuated, said machine manually actuated for vacuum cleaning operations.

4. The greenhouse described in claim 1 further including a perimeter moat inside, under and about said greenhouse whereby crawling insects are denied easy access into said greenhouse, aquatic life can be raised and precipitation or rainwater falling upon said greenhouse is collectable.

5. The greenhouse described in claim 4 additionally providing support for and integration with at least one aggregate air filter on at least one side within said greenhouse, said aggregate filter supported by an open rust resistant metal mesh suspended between said structural skeleton frames over a portion of said moat, said moat having a summer water level sufficiently low to allow outside air access through said filter and a winter water level sufficiently high to deny outside air access through said filter, said greenhouse also including thermally actuated upper air exhaust means with heat opening and cold closing actuators.

6. The greenhouse described in claim 5 additionally providing support for and integration with a thermal siphon water circulating and air conditioning system of plastic pipeline embedded in said aggregate filter and also set upon said filter, said water circulating system looping the inside perimeter of said greenhouse and dipping down and rising out of said moat at least once, a top of a riser of said system containing a thermostatically controlled electric water heater element for winter heating; said plastic pipeline set upon said aggregate filter being level and perforated along the top, said water circulating system being maintained by a valved external source of water and caused to overflow via said perforations onto said aggregate air filter by a thermostatically and humidistatically controlled moat pump whereby the humidity can be increased and summer cooling can be caused by evaporation of water from said filter, and said winter heating by overflow of heated water upon said aggregate filter can be improved beyond conduction of heat through plastic pipe to said aggregate filter and the air.

7. The greenhouse described in claim 6 further including: an outside interfaced summer evaporative cooling and winter solar heating pond set over and, intermittently hydraulically interconnected with a thermal and precipitation of rainwater cistern containing at least two pumps, one of said pumps providing cistern water to a pond sprinkler system and the other pump providing valved injection jets in the ends of a flow through trough in said pond, said trough being level with and hydraulically connected to said circulating system perforated pipe at one end and at the other end dipping down and through said cistern and moat via a plastic pipeline to the bottom of a riser containing said electric heating element whereby said flow through trough and appurtenant piping connections from a reversible thermal siphon circulating system about said greenhouse with said inside thermal siphon circulating system; said cooling and heating pond also including a black plastic pipe, pipe trough and pipe fittings hinged frame covered by an outer translucent plastic skin and partially by an inner blackened plastic skin, said frame set about the outer perimeter of said pond such that said apparatus when upright serves as a summer fence and when swung down becomes a winter cover over said pond for capture and containment of solar radiation via said black plastic pipe and pipe trough frame and blackened plastic skin which are respectively filled and wetted by outer cover deflected pond sprinklers for heat absorption by said stored water which when pumping delivers part of the heated water to said flow through trough and the remainder to said pond via said inner cover until sufficient stored water fills the pond and hydraulically connects said pond and said flow through trough and additionally activates a drawdown siphon in said pond partially dumping said heated pond water into said cistern for storage, said sprinkler system and drawdown siphon also causing fenced summer evaporative colling and storage, said drawdown siphon being of greater flow than the pumped sprinkler system thereby periodically dumping the filled pond back into said storage cistern which is also filled from moat overflow of collected rainwater; said singly open appropriate injection jet and thermostatically activated pump not only increasing the applicable thermal siphon circulation but also causing overflow of said perforated top pipeline onto said aggregate filter for appropriate thermal demands; and said moat being maintained at the appropriate level by a water level valve from said pond and a variable level precipitation or rainwater drain from said moat to said cistern.

8. The greenhouse described in claim 5, further including a plastic pipe and pipe fittings hinged frame covered by a translucent plastic skin set about the outside perimeter of said moat such that said apparatus when upright serves as a summer fence and when swung down becomes a winter cover of said outside moat.

9. The greenhouse described in claim 4 additionally providing support for and integration with a hydraulic collection, conveyance and concentration pipeline for picked produce, said pipeline including a manually actuated moat pump supplying water at one end of said pipeline, open pipe risers for deposit of said picked produce, and a concentration reservoir at the other end of said pipeline containing a moat return drain; said pipeline being level, of sufficient size to allow floating conveyance of such produce as tomatoes, bell peppers, and the like and being partially drained by said moat return drain such that the pumped water shall flow from its entrance to the concentration reservoir conveying said deposited produce thereto.

10. The greenhouse described in claim 4 additionally providing support for and integration with a greenhouse ridge sprinkler system consisting of perforated plastic pipe and pipe fittings interconnected with said structural skeleton supplied by a moat pump thermostatically actuated by a warmed plastic skin covering sensor whereby water is sprinkled upon the skin covering to absorb heat from said skin for evaporative cooling in summer, solar heating moat storage in winter, fire protection continuously, and snow and ice removal when required.

11. A greenhouse comprising a structural skeleton of interconnected frames of reinforced cement grout filled plastic pipe and interconnecting plastic pipe fittings, said frames of corresponding configurations and said interior frames of repeated configuration; said frames mounted on a floor providing support for and integration with a securely attached translucent plastic skin covering and suspended horizontal riding operator access over said floor and between suspended planters, with electrical and water supply means included and further including a sequenced and timed interval hydronutrient system incorporating elevated storage and mixing tanks supplying by gravity a vertically adjustable valved hydronutrient distribution network in fluid communication with horizontal planter pipes containing capillary and siphon distributors, said system being adapted to deliver hydronutrients to plants in said planters upon timed activation of a solenoid valve in said vertical network.

12. The greenhouse described in claim 11 wherein said operator access comprises a suspended horizontal rail-riding service tram riding on at least two rails whereby said tram provides a riding operator with ready access to all planting areas over floor planters and between suspended planters.

13. The greenhouse described in claim 12 further including a perimeter moat inside, under and about said greenhouse, said moat including a perimeter hinged summer fence-winter cover, whereby crawling insects are denied easy access into said greenhouse, aquatic life can be raised, rainwater falling upon said greenhouse is collectable and said moat is protected from trespassers and winter weather.

14. The greenhouse described in claim 13 additionally providing support for and integration with at least one aggregate air filter on at least one side within said greenhouse, said aggregate air filter supported by an open rust resistant metal mesh suspended between said structural frames over a portion of said moat and said AGRIUM also including thermally actuated upper air exhaust means with heat opening and cold closing actuators; said aggregate air filter communicating with outside summer air due to a lower moat water level and only communicating with inside air during winter via the duct formed by the raised moat water level, said skin covering, said moat and said aggregate air filter.

15. The greenhouse as described in claim 14 additionally providing support for and integration with a thermal siphon water circulating and air conditioning system of plastic pipeline embedded in said aggregate filter and also set upon said filter, said water circulating system looping the inside perimeter of said greenhouse and dipping down and rising out of said moat at least once, a top of a riser of said system containing a thermostatically controlled electric water heater element for winter heating; said plastic pipeline set upon said aggregate air filter being level and perforated along the top, said water circulating system being maintained by a valved external source of water and caused to overflow via said perforations onto said aggregate air filter by a thermostatically and humidistatically controlled moat pump whereby the humidity can be increased and summer cooling can be caused by evaporation of water from said filter and said winter heating by overflow of heated water upon said aggregate filter can be improved beyond conduction of heat through plastic pipe to said aggregate filter and the air.

16. The greenhouse as described in claim 15 additionally providing support for and integration with a greenhouse ridge sprinkler system consisting of perforated plastic pipe and pipe fittings interconnected with said structural skeleton supplied by a moat pump thermostatically actuated by a warmed plastic skin covering sensor whereby water is sprinkled upon the skin covering to absorb heat from said skin for evaporative cooling in summer, solar heat moat storage in winter, fire protection continuously, and snow and ice removal when required.

17. The greenhouse as described in claim 16 additionally providing support for and integration with a sequenced and timed interval hydro-nutrient plant nourishment system incorporating elevated storage and mixing tanks supplying by gravity a vertical adjustable valved hydro-nutrient distribution plastic piping network for supplying the various planter horizontal slotted plastic pipe distribution networks containing string capillary and siphon plant feeders, said system delivering hydro-nutrient to the plants upon timed activation of a solenoid valve in said vertical network.

18. The greenhouse as described in claim 17 additionally providing support for and integration with a built-in plastic pipe vacuum cleaning collection system incorporated with a sequenced and timed interval air jet pollinating and root aeration system using some plastic pipe rails of said suspended planters for the air expelling distribution network, said air jets being directionally adjustable and expelling pollinating jets of air and injecting air into the bottom of said planters provided by a common vacuum-blower machine automatically actuated, said machine manually actuated for vacuum cleaning operations.

19. The greenhouse as described in claim 18 additionally providing support for and integration with a hydraulic collection, conveyance and concentration pipeline for picked produce, said pipeline including a manually actuated moat pump supplying water at one end of said pipeline, open pipe risers for deposit of said picked produce, and a concentration pond at the other end of said pipeline containing a moat return drain; said pipeline being level, of sufficient size to allow floating conveyance of such produce as tomatoes, bell peppers and the like and being partially drained by said moat return drain such that the pumped water shall flow from its entrance via said pipeline to the concentration pond conveying said deposited produce thereto.

* * * * *